OPTICAL READING MACHINE

Filed July 7, 1967 4 Sheets-Sheet 1

INVENTOR
Jacob Rabinow
Leonard F. Glaeser Jr.
BY Joseph A. Genovese
ATTORNEY

INVENTOR
Jacob Rabinow
Leonard F. Glaeser Jr.
BY Joseph A. Genovese
ATTORNEY

OPTICAL READING MACHINE

Filed July 7, 1967 4 Sheets-Sheet 3

INVENTOR
Jacob Rabinow
Leonard F. Glaeser Jr.

BY Joseph A. Genovese

ATTORNEY

INVENTOR
Jacob Rabinow
Leonard F. Glaeser Jr.

BY Joseph A. Genovese

ATTORNEY

United States Patent Office 3,538,499

Patented Nov. 3, 1970

3,538,499

OPTICAL READING MACHINE

Jacob Rabinow, Bethesda, and Leonard F. Glaeser, Jr., Rockville, Md., assignors to Control Data Corporation, Rockville, Md.

Filed July 7, 1967, Ser. No. 651,904

Int. Cl. G06k *9/12*

U.S. Cl. 340—146.3 5 Claims

ABSTRACT OF THE DISCLOSURE

An optical reading machine using a single photosensitive scanner and more than one optical system for optically coupling parts of a document while being transported, with the photosensitive portion of the scanner. Specific parts of the document are preselected for reading by positioning the optical systems as necessary to examine parallel lines of print successively in a single pass of the document, even though the lines may be printed above each other on the document. Light interference on the photosensitive portion of the scanner which would originate from the separate optical inputs from the several optical systems, is avoided by operating shutters under program control so that only one optical system is optically transmissive at a time.

This invention relates to reading machines and particularly to the class of machines designed to read one or more lines of print on documents while they are in motion as opposed to the type of machine which reads lines of print while the documents are at rest. Although there are exceptions, most page readers and many reading machines using cathode ray tube flying spot scanners are examples of the latter type of machines. The former class of machines are often used for reading "turn around" documents (e.g. utility bills and credit card impressions) since they have only one line (or a few lines) of print to be read by machine. In many instances, readers for a single line of print (characters, codes, graphic marks, etc.) are speed-limited by the rate at which documents can be fed and conveyed through the reading station of the machine.

While it is true that any page reading machine can be used to read documents containing only a single line of print, such an application is not economically justified as to cost and document through-put rate. This reason has prompted the development of a family of "single line" readers designed to be matched with single line reading tasks. The machines considered soundest from a cost-performance standpoint, for single line reading, are those using scanners which include a single column or row of photocells, or a mosaic of photocells, or a single photocell with a scanning disc. The following patents of the assignee hereof disclose examples of the respective scanners mentioned above: U.S. Pat. Nos. 3,104,369 and 3,264,469 and 3,201,751 and 3,271,740. Machines using a cathode ray tube scanner, e.g. as in assignee's Pat. No. 3,142,818, can also be used as single line readers, however, cost and other limitations inherent in CRT scanning must be considered.

No serious problems are encountered in design and construction of signal line readers using any of the above (or other) scanning techniques. Many such machines are in use and they read single line documents on the fly with considerable satisfaction. However, quite a problem is encountered when the documents contain, two, three or more lines, and the designer wishes an inexpensive machine to read these documents on the fly. The obvious answer is to use a single line reader, and to pass the documents through the machine two, three or more times, i.e. once for each line of print on the documents. This is obviously time consuming and introduces expensive collating and data processing problems. The next obvious solution is to use a machine amounting to a composite of more than one reader including a plurality of scanners, separate sets of logic circuitry, and interpreters together with a buffer and special circuits to unscramble the buffered data to assure that the output reflects the proper order corresponding line-by-line to the print on each document. This is costly. The invention disclosed herein provides a solution to this problem, which allows a through-put document rate substantially equal to that of a single line reader at a minor increase in cost. In other words, the invention retains the basic advantages of a single-line, on-the-fly reader but increases the capability of such machines to read two, three or more lines on a document in a single pass even though the lines of print are partially or wholly located above each other as viewed while the document is moving in a direction parallel to the lines of print.

In the illustrated embodiments of the invention the above is accomplished by using any suitable interpreter and/or processor circuits together with a single photosensitive means for impressing video signals ("black" and "white" representative signals) on the processor circuits. The single photosensitive means can assume any of those configurations considered desirable, e.g. a column, a mosaic, a disc photocell assembly and others. Between the document reading station (an area through which the transported document passes) and the single photosensitive means, there are a plurality of optical systems in optical alignment with the reading station and the photosensitive portion of the scanner. For brevity, the photosensitive means or portion of the scanner shall be referred to as a column of photocells.

One or more of the optical systems are adjustable by having its end nearest to the reading station, selectively positionable in planes parallel or approximately parallel, to X and Y axes while the other end may remain in a fixed position. Thus, assuming that the document moves in a direction parallel to the X axis, one optical system can be positioned ahead (or behind) the other. The result is that as the document moves through the reading station, one line of print is examined by one optical system and then a second line is passed through the field of view of another optical system. If three or more optical systems (for the third and additional lines of print) are used, they too are adjusted along the X axis so that the third line is examined after the second, the fourth after the third, etc.

The significance of the above is that the lines as printed on the document, can be partially or wholly one above the other and yet line one is examined first, line two is examined second, line three is examined third, etc.

In order to be able to use more than one optical system with a single column of photocells, one embodiment of the invention has each system optically coupled with the photocells by separate sets of light conductors such as fiber optical rods (light pipes). Each set has one end of each light pipe so arranged as to form a column over which the images of the characters of one line of print pass (as the document is transported). The other end of each pipe faces the cathode of its respective photomultiplier of the column. Another embodiment of the invention has each system optically coupled with the columnar ends of a single set of light pipes. Their opposite ends face the cathodes of respective photomultipliers as above.

Accordingly, an object of this invention is to provide a reading machine possessing the advantages of a single line, on-the-fly reader with the capability of reading documents containing more than one line of print.

Another object of the invention is to provide such a reading machine by utilizing separate optical systems associated with a column of photocells substantially as described in the preceding description.

Use of separate optical systems with a single column of photocells in the manner disclosed herein gives rise to a light interference problem. When one system is in use, the others can conduct spurious or other light via their sets of light pipes to the photocells. Thus, another object of the invention is to close off, e.g. by shutters, all of the other optical systems during the time one is in use, i.e. examining a line of print. As two illustrated forms show, the shutters can be located at different places with respect to the optical systems. Another embodiment shows darkened areas of the document acting equivalently to shutters.

One purpose of adjustment of one or more optical systems along the X axis has been described. Adjustment along the Y axis enables the machine operator to position each system so that it is vertically registered with its line of print during reading in a single pass of the document. This provides for greater flexiblity in that the lines can be printed in any vertical position on the document. For instance, the lines of print on a gas bill may be spaced differently or may be different distances from a reference edge of the document, than the lines of print on an electric or water bill or coupon or credit card imprint or lottery ticket or merchandise inventory tag and/or price tag and/or numerous other examples.

In addition to adjustment along X and Y axes, one or more of the optical systems can be made adjustable in a manner to change the size (enlarge or reduce) the image of the line of print being examined. Thus the images are easily normalized (as to size) by this feature. This is important in reading characters when the size of some characters in one line is different from the other characters or the characters of one line differ from those in another line. This feature has, perhaps, an even greater advantage in reading a line of optical codes, holes, or graphic marks. Their images can be so enlarged that two or more photocells of the column can service ("look at") each code or graphic mark area thereby utilizing the greater resolution designed into the machine for character reading.

Aside from expense considerations, the use of a single photosensitive portion of a scanner with separate optical systems (instead of a plurality of complete scanners) leads to other benefits. For example, assume that the photosensitive portion alone contains eighty photomultipliers instead of two hundred and forty as would be required for a machine of equal resolution having three separate scanners. The original matching of photomultipliers and the subsequent drift and aging of the tubes presents a far more manageable situation with the smaller number of photocells.

Furthermore, only a few operational advantages of the invention, as reading a plurality of lines of print on-the-fly, have been mentioned. In addition, one of the optical systems, being positionally adjustable as described, can be used for special purposes as reading marks, holes, or codes. It can also be used as a prescanner without providing a full prescanner assembly. Some of the uses for a prescanner are mentioned in the Rabinow et al. Pat. No. 3,104,369.

Other objects and features will become evident in the following description of the illustrated embodiments of the invention. In the drawings.

Figure 1:
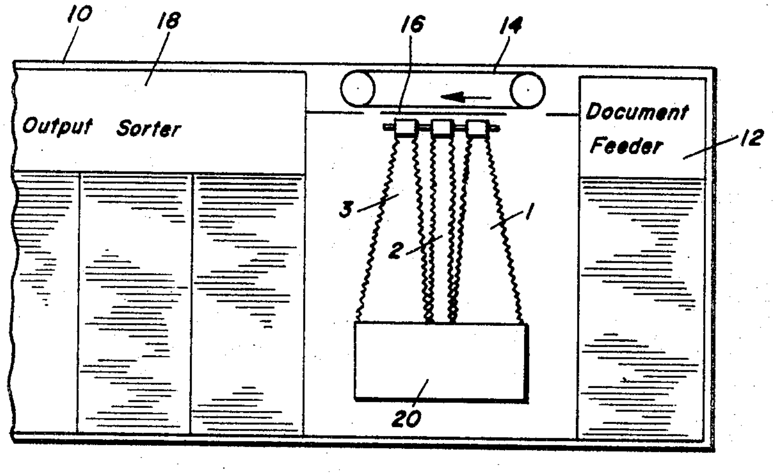
FIG. 1 is a fragmentary view of a reading machine exemplifying the invention.

Reading machine 10, fragmentarily shown in FIG. 1, exemplifies the invention. The machine has a frame supporting the necessary components in an operative manner. Among these are a conventional document feeder 12 which feeds documents from an input stack one by one onto document conveyor 14. The conveyed documents pass through a reading station 16 and are discharged into a conventional output sorter 18 containing the desired number of output pockets, bins or the like.

Three optical systes 1, 2 and 3 respectively are in optical alignment with the reading station 16. The details of the optical systems are described later, and it is to be understood that fewer or more than three optical systems can be used depending upon the wishes of the designer. Regardless of the number of optical systems used, one end of each is in optical alignment with the documents as they pass through reading station 16, while the opposite ends of the optical system communicate with the interior of a light-tight chamber 20 containing arrays of fiber optical rods or light pipes (FIG. 2) arranged as described below.

There are three arrays 22, 24 and 26 of light pipes, one array for each of the three optical systems 1, 2 and 3. The receiving ends of array 26, for example, are arranged as a vertical column 27 (FIG. 3) in a slot in the front wall of chamber 20. The opposite ends of the light pipes of array 26 terminate in alignment with the cathodes of a group of photocells, e.g. photomultipliers 30, forming the photosensitive portion of the scanner of the reading machine. Arrays 22 and 24 of light pipes are similarly arranged, i.e., their receiving ends are arranged as columns in slots formed in the front wall of chamber 20, and one light pipe of each array 22 and 24 has its emitting (opposite) end optically aligned with the cathode of a respective photomultiplier 30. Thus, (FIG. 2) the top illustrated photomultiplier 30 has the top light pipe of each of the three columns of arrays 22, 24 and 26 in communication with it. The second light pipe of each column of the three arrays is optically aligned with the second photomultiplier. The same is true of the third, fourth, etc. light pipe of each column and its respective photomultiplier.

From the photosensitive portion of the scanner to the output recognition lines 32 of the reading machine, conventional techniques and circuits can be used. For example, the character recognition portion of the machine can be patterned along the lines of many prior machines, for example, the machine disclosed in U.S. Pat. No. 3,104,369. As in that patent the outputs of the photomultipliers can be quantized before or after amplification at 34 and the signals representing "black", shades of "gray" and "white" are conducted on the lines of cable 36 to be gated at 38 into the processor circuits 40 in synchronism with the horizontal motion of the document through reading station 16. The latter function is schematically illustrated by the clock signal line 42. Upon processing the signals representing "black" and "white" (and "gray" when multileveling quantizing is used) the processed signals are interpreted as at 44 to yield a character-identity signal on one of the lines 32. Descriptions or specific details of the circuits to accomplish the above functions are unnecessary because typical circuits are disclosed in full detail in numerous prior patents which will serve the purpose very well.

Figures 2, 3:
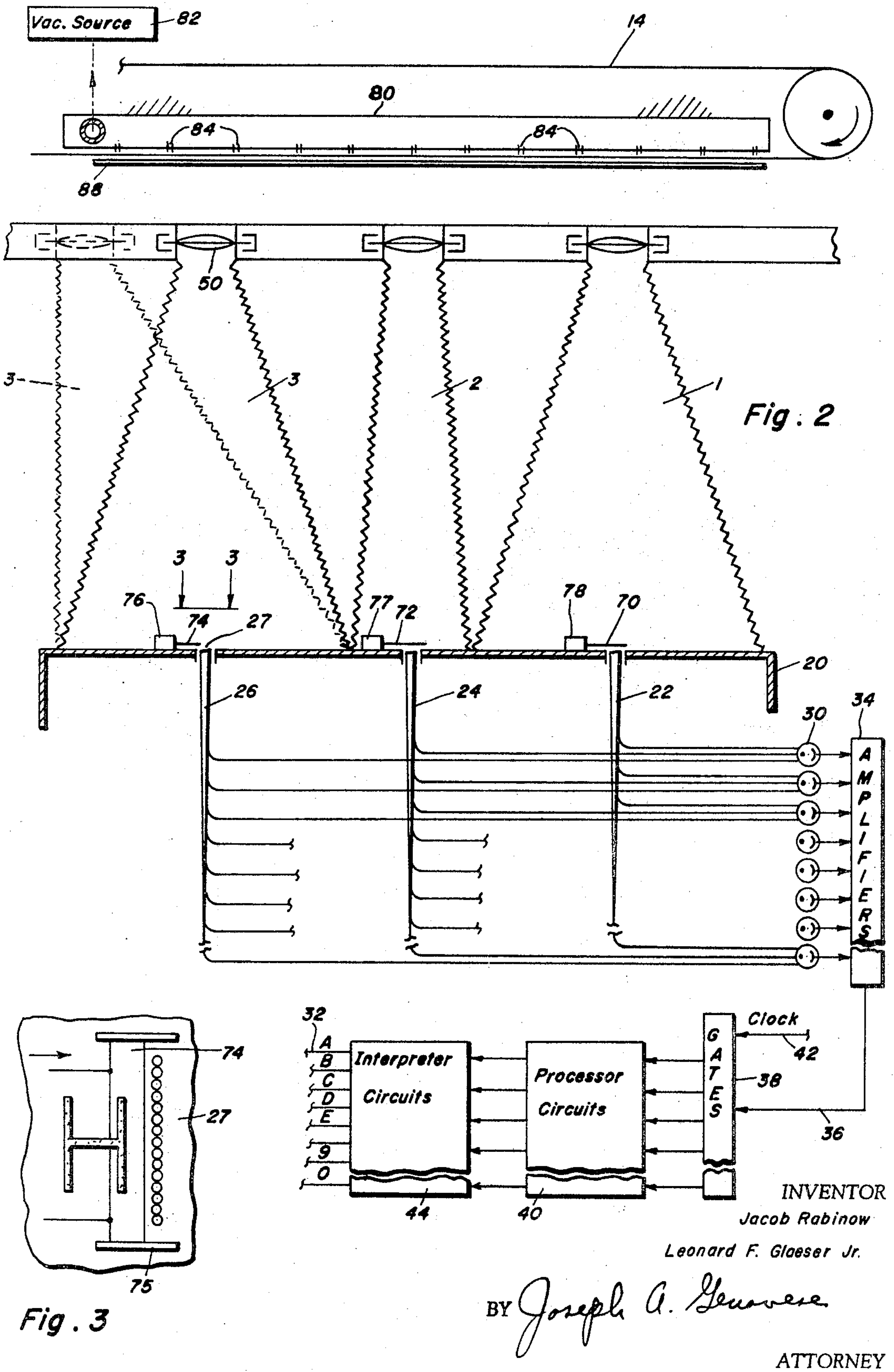
FIG. 2 is an enlarged top schematic view of a portion of the machine shown in FIG. 1.
FIG. 3 is an enlarged view taken on the line 3—3 of FIG. 2 and showing the ends of one set of light pipes of one of the three illustrated optical systems.
Figures 4, 5, 6:
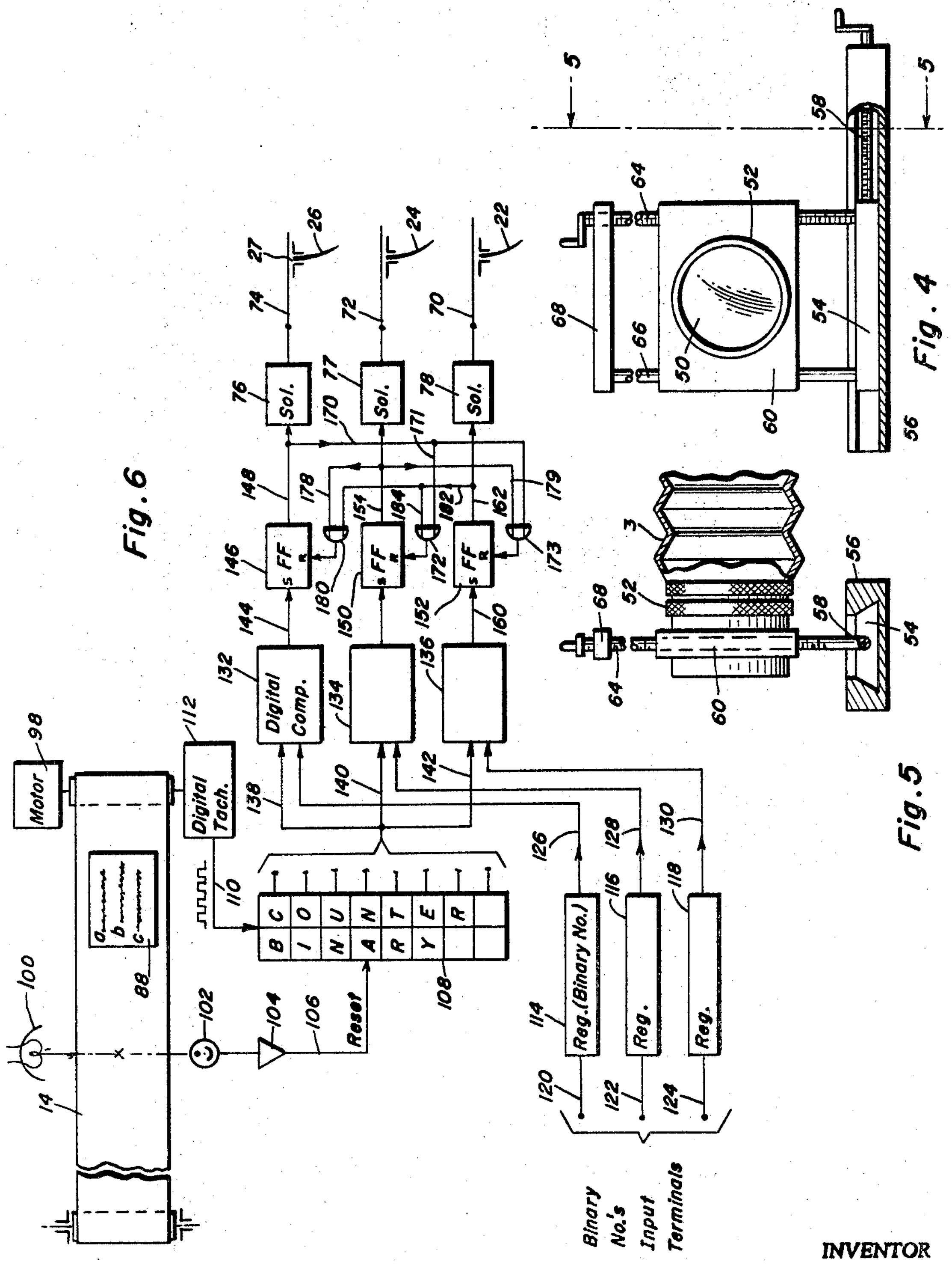
FIG. 4 is an end view, partially in section, showing one way of adjusting one of the optical systems in X and Y planes.
FIG. 5 is a sectional view taken on the line 5—5 of FIG. 4.
FIG. 6 is a schematic view showing logic circuits which enable the machine to operate in a line-by-line reading mode regardless of the documents format.

Optical systems 1 and 3 are identical. While optical system 2 may be constructed identically, one direction of adjustment of optical system 2 will be unnecessary in the great majority of cases. As shown in FIGS. 2, 4 and 5, a typical optical system 3 is made of a bellows having a lens 50 at one end and attached to the front wall of chamber 20 at the other end. The lens can be mounted within a lens barrel 52 to provide focus adjustment, or if desired, the lens 50 can be removed and relocated (and/or replaced with a different lens) at any distance between the reading station and the column 27 of light pipes for large magnification adjustments.

The bellows of optical system 3, including the lens 50, is adjustable in a plane containing X and Y axes, i.e. is adjustable along an X axis and/or along a Y axis. While the adjustment can be obtained in numerous ways and is only schematically shown in FIG. 2, one way is illustrated in FIGS. 4 and 5. To obtain adjustment along an X axis, sliding block 54 is adjustable in ways 56 by means of screw 58. The lens barrel 52 is attached to mounting plate 60 which is fixed for horizontal movement with block 54. Thus, the turning of screw 58 will shift the field of view of the optical system 3 horizontally along the X axis. To obtain vertical adjustment, screw 64 is turned, this screw passing through a threaded bore in mounting plate 60 and mounted for rotation in block 54. To constrain the movement of mounting plate 60, guide 66 which is attached to block 54 and to the cross member 68, passes through a passage in the mounting plate.

Optical system 1 can be identical to optical system 3, however, optical system 2 need not be horizontally adjustable. Therefore, only the vertical adjustment mechanism typified by screw 64 of FIG. 4, need be applied to the optical system 2.

The design of the machine is such that at any one time only one of the three illustrated optical systems is allowed to transmit light to the photosensitive portion of the scanner. To accomplish this, three optical shutters 70, 72 and 74 are mounted in a manner to close off or block the receiving ends of the light pipe arrays forming the three columns mentioned before. The shutters can assume any configuration, however, they are schematically shown as vanes (FIG. 3) horizontally slidable in ways 75 under the control of solenoids or the like. Since there are three shutters, there are three solenoids 76, 77 and 78 whose operation is again discussed in connection with the description of the logic circuitry of FIG. 6.

The ways 56 (FIG. 2) can be separately provided for optical system 1 and 3 or if desired a single way 56 can be rigidly attached to the frame of the machine. Since the focal length is generally somewhat critical in optical character reading machines, code reading machines and mark sensing machines, the latter construction offers an advantage.

To prevent the shifting or skewing of the documents in the reading station, there is a vacuum box 80 operatively connected with a vacuum source 82. Ports 84 in the vacuum box 80 face the reading station 16 in order to allow the vacuum to energize conveyor belt 14 as it passes thereover or to vacuum-energize the space between individual belts forming conveyor 14 if the latter construction is preferred. Thus, when the document is adhered to the conveyor as it passes through the reading station, it will not shift rotationally, and it will be a fixed, predetermined distance from the lenses of the three optical systems.

As discussed before, a major, although not an exclusive purpose of the adjustment of the optical systems is to enable multi-line documents to be read on-the-fly using a single scanner, a single set of amplifiers, quantizers, gates, processor circuitry, etc. Documents can have any format that the user wishes and in practice, it is found that formats vary a great deal. Therefore, a typical document (FIG. 7) 88 with three lines *a*, *b*, and *c* of characters is shown. The document 88 moves horizontally to the left as illustrated and the optical systems of the reading machine are adjusted to suit the document format, that is, so that one line is completely examined and immediately thereafter the next line is examined by a different optical system, and immediately thereafter the third line is examined by the third optical system. The three optical systems 1, 2 and 3 are represented as three photocells in this figure and they are shown together at the top of FIG. 7. To read the lines *a*, *b*, and *c* of document 88 on-the-fly as it moves horizontally to the left, the optical adjustment (for the particular format illustrated) is shown near the top of FIG. 7. Optical system 1 is adjusted to the right and upward, optical system 2 is moved vertically upward, and optical system 3 is moved horizontally to the left and vertically downward the distances illustrated (these parts of the drawings are to approximate scale). Thus, as the document achieves position **88*a*** (FIG. 7) the line *a* of characters will have passed through the field of view of optical system 1 and line *b* of characters will have just approached optical system 2 in its adjusted position. When the document achieves a position **88*b*** through the reading station, line *b* will have been examined by optical system 2 and line *c* will have just approached optical system 3. When the document reaches position **88*c***, line *c* will have passed through the field of view of optical system 3. Succeeding documents of the same format will be examined in exactly the same way. For documents having different formats, adjustments of the optical systems 1, 2 and 3 are made to conform to the format.

Figure 11:
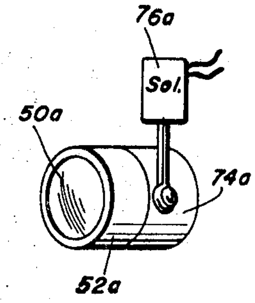
FIG. 11 is a perspective view showing a lens-shutter detail.
Figure 10:
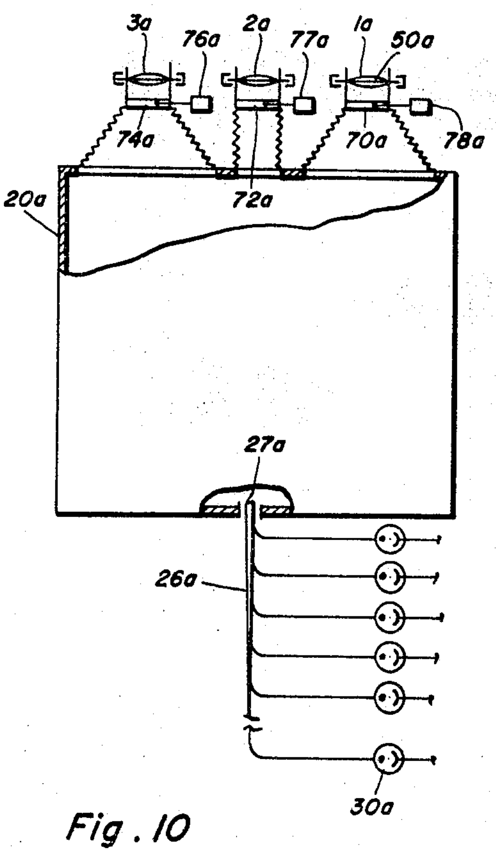
FIG. 10 is a top schematic view of another embodiment.

Attention is now directed to the embodiment shown in FIGS. 10 and 11 which differ from the embodiemnt of FIG. 2 by the location of shutters **70*a*, 72*a* and 74*a*. They are adjacent to their lenses 50*a* in optical systems 1*a*, 2*a*, and 3*a*. The lens barrel 52*a* (FIG. 11), lens 50*a* and shutter 74*a* can be a single assembly. An advantage of the FIG. 10 embodiment is that only one array 26*a* of light pipes with one set of ends forming a column 27*a* is required. The opposite ends of the light pipes terminate at the photomultipliers 30*a* of the scanner, and from there to the recognition wires 32** the machine can be the same as in FIG. 2.

It is understood that the actuators **76*a*, 77*a* and 78*a* are identical to the actuators 76, 77 and 78. They differ in location and in the fact that they close off their optical systems 1*a*, 2*a* and 3*a*** at or adjacent to their lenses rather than at the receiving ends of three arrays of light pipes. Otherwise, the functions, adjustments, uses, etc. of the optical systems remain the same as those already described and to be described in connection with the embodiment of FIG. 2.

Figure 12:
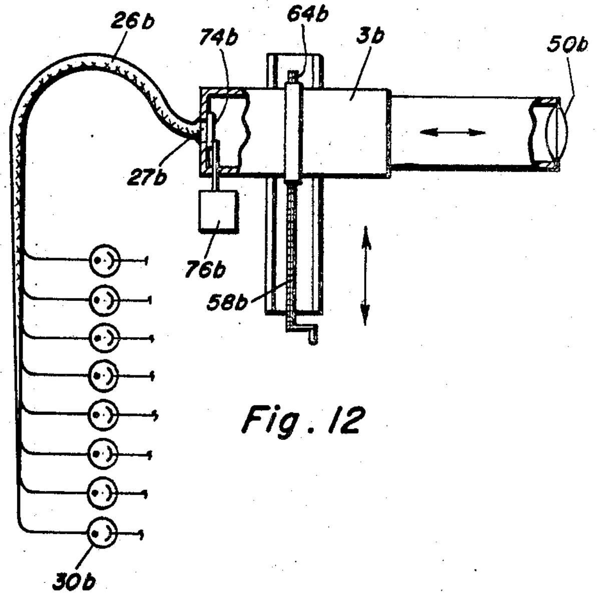
FIG. 12 is a fragmentary top view of another embodiment.

Turning now to FIG. 12, the illustrated embodiment can use a single array of light pipes **26*b* as in FIG. 11 or can use a plurality of arrays in the manner of FIG. 2. Of course, the shutter 74*b* and actuator 76*b* of the illustrated optical system 3*b* are located at the lens 50*b* or at the columnar ends 27*b* of the light pipes depending upon which of the options is selected. In either case the opposite ends of the light pipes face the photomultipliers 30*b*** of the scanner.

The main distinction of the embodiment of FIG. 12 is that the light pipes are flexible enabling the entire optical system **3*b* (and the others, not shown) to be adjusted along X and Y axes by adjusting mechanisms represented by screws 58*b* and 64*b* (same as in FIG. 4). Focus adjustment is obtained by telescoping the sections of the rigid light tunnel to move the lens 50*b*** closer or farther from the plane of the document in the reading station.

From the standpoint of optics design, the embodiment of FIG. 12 is the most desirable because the lens of each optical system always remains on axis with the columnar ends of the light pipes on which the images of the examined characters are formed. In the other embodiments the lenses may move angularly and off-axis. This requires wide angle lenses or some other known optical arrangement.

Figure 13:
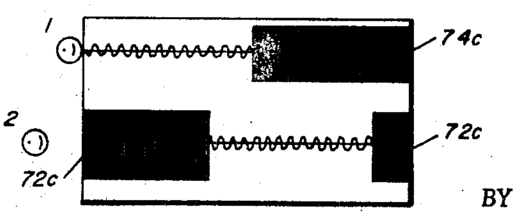
FIG. 13 is a plan view showing areas of a document which can be used to serve the function of the lens shutters of other embodiments.

The function of all of the described shutters is to render their optical systems operative for the purpose of conducting light to the photosensitive portion of the scanner. As shown in FIG. 13, the document itself can have dark (black) areas as at **72*c* and 74*c* which function identically to shutters 72, 72*a* or 72*b* in the machine. The dark areas are located at the beginnings and ends of all of the lines of print, and mechanical shutters such as at 72 or 72*a* or 72*b*** can be eliminated together with their solenoids and a considerable portion of associated circuitry. It is understood, of course, that the dark areas of FIG. 13 reflect little light (ideally no light) into the optical systems aligned therewith, which is functionally similar to shuttering the optical systems by mechanical means.

The type of document (excluding the special case of FIG. 13) handled by the reading machine is inconsequential. For example (FIG. 8) in addition to the kinds of documents already mentioned, the machine can be used to read printed characters on punched card 91 or can be used to read the addressee, address and zip code on a postal article such as letter 92. It is obvious that the machine may be used to detect marks or to read codes on many types including bar codes, and/or the codes shown on two of the documents in FIG. 9.

Figures 7, 8, 9:
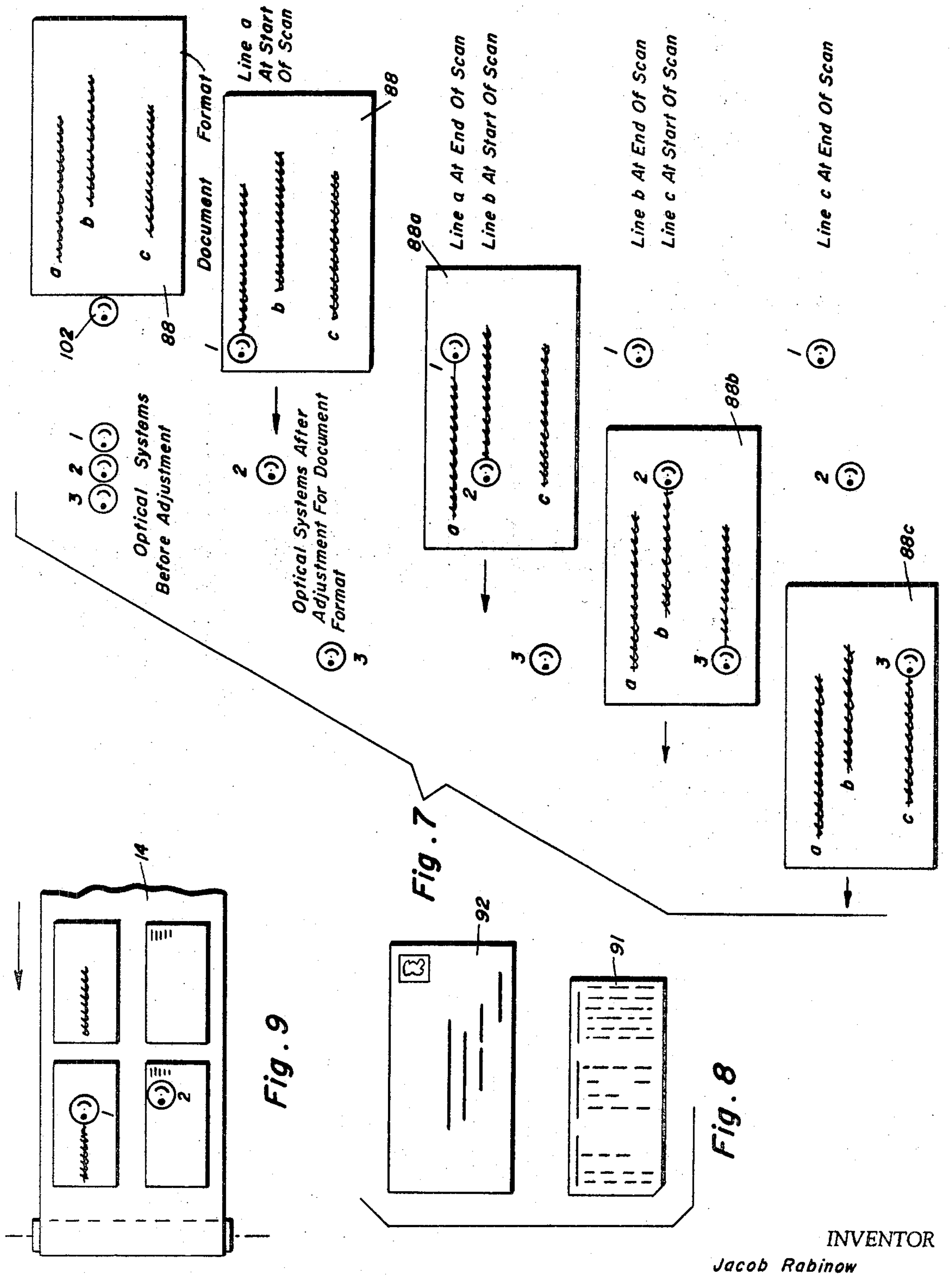
FIG. 7 is a set of diagrammatic views showing the adjustment of the optical systems required for the machine to read the lines of a document having the illustrated arbitrarily selected format, and also showing successive positions of the document as the lines are scanned.
FIG. 8 is a view showing two of the many kinds of documents for which the reading machine is designed.
FIG. 9 is a fragmentary view showing a further use of the machine, by which separate optical systems are used to read individual documents while they are simultaneously conveyed through the reading station.

The purpose of FIG. 9 is to illustrate a mode of operation where one optical system, for instance, optical system 1 is used to examine a line of print on the upper documents conveyed by conveyor 14 and another optical system 2 is used to read codes, lines, etc. on another set of documents simultaneously conveyed by the conveyor. The only limitation imposed on the concurrent multiple document reading mode is that the reading by one optical system must be completed before the commencement of reading by the second and/or third and/or fourth, etc. optical system just as the reading of line a (document 88 of FIG. 7) was completed prior to the commencement of the reading of line *b* and the reading of line *c* commenced after completion of reading of line *b*.

While the lower part of FIG. 2 shows conventional optical character recognition logic and circuits, it is understood that conventional circuits for mark sensing and code recognition must be present if the machine is expected to read codes, detect marks, and/or read alphanumeric characters. Even though the reading machine logic and logic circuits can be conventional, special control circuits are required to enable the reading machine to function in the manner described. Although the scanner and logic circuitry following the scanner functions the same regardless of whether the optical information is presented to the scanner via optical system 1, or 2, or 3, (or others if used) it is necessary that the optical information be presented to the scanner from only one optical system at a time, i.e. the others must be closed during the time that one is optically transmitting. Additionally, although the optical systems can be manually adjusted (FIG. 7) to suit the format of a particular run of documents, sufficient control circuitry must be provided to enable the opening and closing of the optical systems at the precise time during the travel of the document to accomplish reading such as shown in FIG. 7. The same applies to circuits for decoding marks, bar codes, etc. These circuits, just as those to read alpha-numeric characters, must be gated on or off when the machine is reading marks or codes or letters and numbers. The reading machine logic circuitry must also be suitably controlled in instances where one of the optical systems is adjusted and used in the manner of a prescanner. To accomplish functions such as these, the typical circuits shown in FIG. 6 can be used. Such circuits can be constructed specially for each reading machine. On the other hand, the functions performed by the circuits shown in FIG. 6 can also be accomplished by the logic and memory of a standard computer which is appropriately programmed. The computer usage for this purpose is very attractive in those cases where a computer is available for other purposes. Only a small fraction of its time and capacity is needed to accomplish what the circuits of FIG. 6 accomplish. As a final alternative to be mentioned, the circuits shown in FIG. 6 can be under computer control as described later.

Document 88 is shown (FIG. 6) being conveyed by conveyor 14 into the reading station. Motor 98 schematically represents a means for driving the conveyor. As the leading edge of document 88 intercepts the light beam directed by illumination source 100 onto the conveyor, the reflection is detected by control photocell 102. The output of the photocell 102 is impressed on quantizing amplifier 104 to produce a signal on line 106 which resets binary counter 108. The binary counter is thereafter stepped, e.g. by pulses on line 110 in synchronism with the movement of conveyor 14, meaning that the movement of document 88 into and through the reading station is counted in incremental steps. A digital tachometer 112 attached to the conveyor 14 as shown, is sufficient to provide pulse signals (corresponding to the incremental steps) on line 110 in synchronism with the movement of the document 88 on the conveyor through the reading station.

Three memory devices, e.g. three binary registers 114, 116 and 118 are assigned to the three optical systems 1, 2 and 3 respectively. A binary number corresponding to the position of the beginning of the first line *a* of print behind the leading edge of the document is stored in register 114. A binary number corresponding to the distance between the leading edge of the document and the end of the first line *a* is stored in register 116. The distance for the beginning of line *c*, similarly calculated, is represented by a binary number which is stored in register 118 for line *c* of document 88. These binary numbers are introduced into registers 114, 116 and 118 over the lines of cables 120, 122 and 124. The binary numbers themselves can be generated by switches, i.e. by manually setting 1's and 0's by turning switches off and on respectively in a matrix thereof, connected to a power supply. The binary numbers can be generated from a keyboard and keyed into the registers, and another alternative is that such binary numbers can be stored in the computer either within its internal or external memory in which case the binary numbers would be introduced from a computer over the cables 120, 122 and 124. Regardless of how these binary numbers are generated, their binary values are represented by signals on the lines of cables 126, 128 and 130 operatively connected to the three memory registers 114, 116 and 118 and terminating in the three digital comparators 132, 134 and 136. The inputs to the three comparators are conducted on the lines of cables 138, 140 and 142 attached to the output terminals of binary counter 108. It is understood that tolerances to account for shutter response times, character positions and line lengths are provided for in the settings of the counters and positioning of the optical systems.

Thus, when the leading edge of document 88 is detected the binary counter 108 is reset to a starting position as described before. As the document moves into and through the reading station its movement is incrementally detected by tachometer 112 and the increments of motion are signaled by stepping pulses on line 110 which steps the binary counter. When the count coincides with the count stored in register 114, there is coincidence at digital comparator 132 to produce a signal on line 144 which sets flip-flop 146. The output signal on line 148 of the flip-flop is used to reset flip-flops 150 and 152 and to operate solenoid 76 in a manner to withdraw shutter 74 from the column 27 of light pipes in array 26. As shown in FIG. 6 the flip-flop 150 has an output line 154 which operates solenoid 77 after resetting flip-flops 146 and 152, upon coincidence of the binary numbers in counter 108 and register 116 (meaning that it is time to commence reading line *b*). By resetting flip-flops 146 and 152, solenoids 76 and 77 are de-energized to make certain that their shutters block their columns of light pipes. The function of flip-flop 152 is now evident. Upon coincidence of the value of the binary number counted by counter 108 and that stored in register 118, the comparator 136 provides a signal over line 160 which sets flip-flop 152. The output from flip-flop 152 over line 162 resets flip-flops 150 and 146 and also operates solenoids 78. Operation of solenoid 78 causes its shutter 70 to unblock the column of light pipes of array 22. The mutual resetting of the various flip-flops is accomplished by a very simple gating which is obvious on inspection in FIG. 6. For instance, a signal on line 148 from flip-flop 146 is fed back to the reset terminals of flip-flops 150 and 152 by means of conductors 170, 171, OR gates 172 and 173, and OR gate output lines connecting to the reset terminals of flip-flops 150 and 152. A signal from flip-flop 150 conducted on line 154 is fed to the reset terminals of flip-flops 146 and 152 via lines 178 and 179, OR gates 180 and 173, and the OR gate output lines connected to the reset terminals of the last mentioned flip-flops. Upon setting of flip-flop 152, its signal on line 162 is conducted over lines 182 and 184 through OR gates 172 and 180 to reset to flip-flops 150 and 146.

The preceding description of the illustrated forms of the invention is given by way of example. Numerous modifications or other changes may be made without departing from the protection of the following claims.

What is claimed is:

1. In an optical reading machine for documents which have lines of print, said machine including processing means responsive to signals applied thereto for providing reading machine outputs, and a document transport provided with means for moving a document approximately parallel to the lines of print thereon, the improvement comprising an optical scanner having a single photosensitive means to provide signals for said processing means, a plurality of optical systems optically coupled to said photosensitive means and adapted to be optically aligned with a document handled by said transport, means for adjustting the position of a first of said optical systems with respect to the other of said optical systems, said adjusting means including a mechanism which adjustably moves said first system in two directions a first of which is approximately parallel to the movement of the document so that as said document is transported said first optical system becomes aligned with said document before said other of said optical systems, and the second said two directions is normal to the first direction so that as said document is transported one line of print thereon becomes optically aligned with said first optical system and another line of print thereon becomes optically aligned with another of said optical systems with the result that the same single photosensitive means service selected portions of the document via said optical systems in a single movement of the document by said transport past said optical systems.

2. The subject matter of claim 1 and means for rendering one of said optical systems inoperative while another of said optical systems is aligned with a line of print on the document.

3. The subject matter of claim 1 and means to adjust the magnification provided by one of said optical systems.

4. The subject matter of claim 1 and means including a shutter for rendering one of said optical systems inoperative while another is operative to transmit light to said photosensitive means, an actuator operatively connected to said shutter, and settable means to operate said actuator in accordance with a predetermined program.

5. The subject matter of claim 4 and means operable with said document transport for controlling said settable means.

References Cited

UNITED STATES PATENTS

| | | | |
|---|---|---|---|
| 1,366,617 | 1/1921 | Wier et al. | 179—100.2 |
| 2,968,793 | 1/1961 | Bellamy. | |
| 3,177,470 | 4/1965 | Galopin | 340—146.3 |
| 3,235,660 | 2/1966 | Treseder et al. | 178—7.6 |
| 3,250,172 | 5/1966 | Abbott et al. | 356—71 X |
| 3,412,255 | 11/1968 | Krieger | 250—227 |
| 3,426,324 | 2/1969 | Manly | 340—146.3 |
| 3,426,325 | 2/1969 | Partin et al. | 340—146.3 |

MAYNARD R. WILBUR, Primary Examiner

L. H. BOUDREAU, Assistant Examiner

U.S. Cl. X.R.

178—7.6; 250—219